United States Patent
Crescenti et al.

(10) Patent No.: US 12,422,595 B2
(45) Date of Patent: Sep. 23, 2025

(54) MULTI-SOURCE ILLUMINATOR

(71) Applicant: Datalogic IP Tech S.R.L., Lippo di Calderara di Reno (IT)

(72) Inventors: Giuseppe Crescenti, Bologna (IT); Luca Gentilini, Ravenna (IT); Marco Gnan, Bologna (IT)

(73) Assignee: Datalogic IP Tech S.R.L., Lippo di Calderara di Reno (IT)

( * ) Notice: Subject to any disclaimer, the term of this patent is extended or adjusted under 35 U.S.C. 154(b) by 0 days.

(21) Appl. No.: 18/773,693

(22) Filed: Jul. 16, 2024

(65) Prior Publication Data

US 2025/0028088 A1    Jan. 23, 2025

Related U.S. Application Data

(60) Provisional application No. 63/527,290, filed on Jul. 17, 2023.

(51) Int. Cl.
*G02B 3/00* (2006.01)
*H04N 1/028* (2006.01)
*H04N 1/03* (2006.01)

(52) U.S. Cl.
CPC ......... *G02B 3/0043* (2013.01); *H04N 1/0288* (2013.01); *H04N 1/0306* (2013.01)

(58) Field of Classification Search
CPC ............... G02B 3/0043; H04N 1/0288; H04N 1/0306; G06K 7/10811; G06K 7/10732
See application file for complete search history.

(56) References Cited

U.S. PATENT DOCUMENTS

| | | | |
|---|---|---|---|
| 5,798,516 A * | 8/1998 | Shreesha | G06K 7/10881 235/462.42 |
| 6,019,286 A | 2/2000 | Li et al. | |
| 6,164,544 A * | 12/2000 | Schwartz | G06K 7/10742 235/462.43 |
| 9,185,306 B1 | 11/2015 | Tan et al. | |
| 9,597,985 B2 | 3/2017 | Nagayasu | |
| 10,346,645 B1 | 7/2019 | Nunnink et al. | |
| 11,262,579 B1 | 3/2022 | Vinogradov | |
| 2003/0128543 A1 | 7/2003 | Rekow | |

FOREIGN PATENT DOCUMENTS

| | | | | |
|---|---|---|---|---|
| EP | 0377973 A2 | 7/1990 | | |
| EP | 377973 B1 * | 6/1996 | ......... | G06K 7/10594 |
| EP | 1281271 A1 * | 2/2003 | ......... | G06K 7/10722 |
| EP | 1281271 B1 | 3/2017 | | |
| EP | 3236198 A1 | 3/2021 | | |

OTHER PUBLICATIONS

International Search Report and Written Opinion received for PCT Patent Application No. PCT/EP2024/070150, mailed on Oct. 9, 2024, 15 pages.

* cited by examiner

*Primary Examiner* — Seung C Sohn
(74) *Attorney, Agent, or Firm* — SHOOK, HARDY & BACON L.L.P.

(57) ABSTRACT

A scanner that reads optical luminance at a field of view (FoV) includes an illuminator that provides light beams to a surface that may be located from a near field to a far field of the FoV. The illuminator can provide optical luminance that has an irradiance, which is uniform or within a certain range from the near field FoV to the far field FoV. The irradiance is achieved by adjusting the location of light emitting components and adjusting the power.

20 Claims, 16 Drawing Sheets

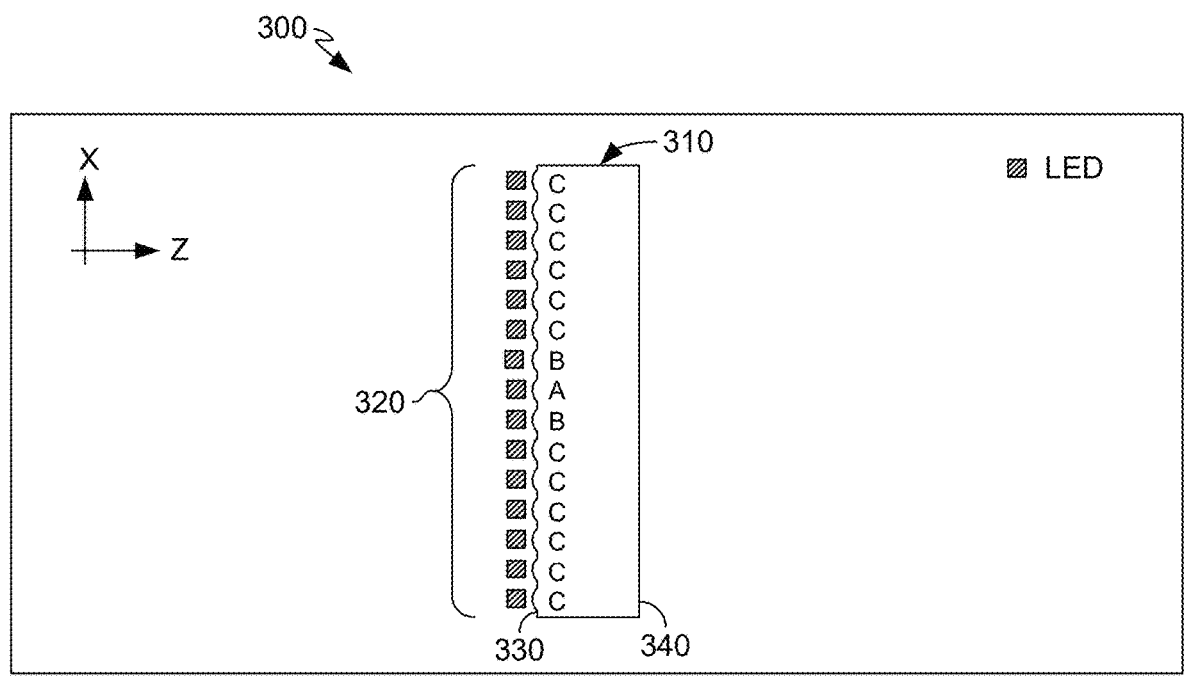
FIG. 3a.
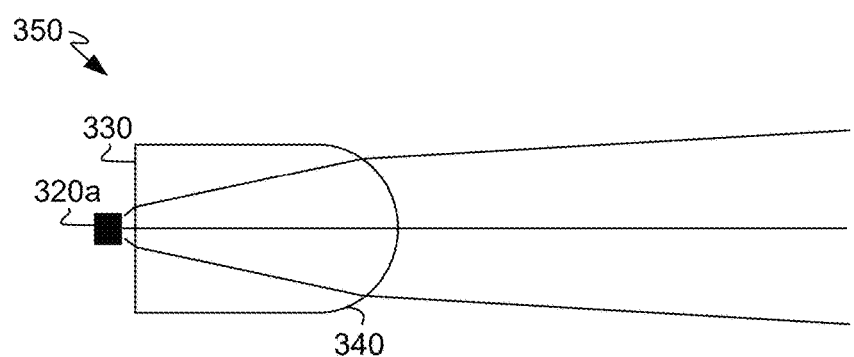
FIG. 3b.
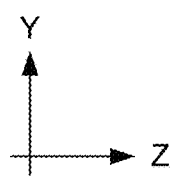

MULTI-SOURCE ILLUMINATOR

BACKGROUND

The present invention relates generally to a scanner that includes an optical receiver and illuminator. A scanner may include components that provide illumination of scanned surfaces. The scanner must be able to illuminate objects in its Field of View (FoV). The optical power of the illumination per surface unit is the irradiance. The standard approach for designing the illuminator is to concentrate light in a far field where light is inherently scarce so that the minimum irradiance level is reached. The main issue with this approach is that at short distances there is either too much irradiance or too little.

SUMMARY

This summary is provided to introduce a selection of concepts in a simplified form that are further described below in the detailed description section of this disclosure. This summary is not intended to identify key or essential features of the claimed subject matter, nor is it intended to be used as an aid in determining the scope of the claimed subject matter.

Embodiments of the present disclosure relate to a multi-source illuminator with optimized light projecting at near field and far field. An optical information scanner that reads over a linear or a bi-dimensional and preferably thin Field of View (FoV) needs an illuminator to be able to provide the right illumination from a few tens of millimeters to a few hundreds of millimeters. In particular, for a system to work without feedback on the exposure conditions, the irradiance on the optical information plane must stay within a range at all working distances.

Systems and methods are disclosed that describe a scanner that is configured to concentrate light in the far field as well as in the near field so that the irradiance is within a certain range at all distances. The expression "optical information" is intended for any graphical representation constituting a coded or un-coded information. A particular example of optical information consists of linear or bi-dimensional optical codes, wherein the information is coded by means of suitable combinations of elements of predetermined shape, for example squares, rectangles or hexagons, of dark color (normally black) separated by clear elements (spaces, normally white), such as the barcodes, the stacked codes and the bi-dimensional codes in general, like DataMatrix Codes, QR Codes and DotCodes, the color codes, etc. The expression "optical information" further comprises, more generally, also other graphical shapes, including printed or hand-written characters (letters, numbers, etc.) and particular shapes (so-called "patterns"), such as stamps, logos, signatures, fingerprints, etc. The expression "optical information" also comprises graphical representations detectable not only in the range of the visible light, but also in the entire range of wave lengths comprised between infrared and ultraviolet.

The scanner may include an image sensor of a linear or bi-dimensional type. The image sensors typically include charge coupled devices (CCDs) or complementary metal oxide semiconductor (CMOS) image sensors that generate data representing a captured image of the optical information that is illuminated by the illuminator. The scanner collects the image from which the information is extracted and processed through an optical receiving system, the image sensor, and dedicated electronics. The optical receiving system may include a lens or a lens system and devices and/or filters in front of the image sensor. The scanner may include an optical receiving system and an illuminator that projects light at different angles to provide irradiance that is within a predefined range at various distances. In some embodiments, this invention improves the industry standard technology by decoupling the design and manipulation of the illuminator lens from the irradiance tailoring. In other embodiments, irradiance is achieved through the design of the lens. In either case, the lens or lens subsystem does not need to be changed or manipulated after design and manufacturing in order to tailor or change the irradiance at relevant distances. Improvement is achieved either through the design of the lens by tilting/curving the surface portions of a first active surface of the lenses or tilting/curving the surface portions of a second active surface of the lenses, by offsetting light emitting components, or by any combination thereof. Therefore, this invention allows fine adjustment of the projected irradiance after the lens is made by adjusting the light emitting components such as adjusting Light Emitting Diodes (LEDs) layout on their Printed Circuit Board (PCB), which is more cost effective than remaking the lens.

In a first aspect of the disclosure, a system for providing illumination for a scanner is provided. The system comprises an optical receiving system and an illuminator. The optical receiving system collects light over a Field of View (FoV). The optical receiving system collects light that is reflected or scattered by a target illuminated by the illuminator. The illuminator includes a one or more optical lens subsystems positioned in proximity to the optical receiving system.

Each optical lens subsystem has two optically active surfaces. The first surface is the input surface facing the light emitting components, the second surface is the output surface. The first surface is divided into portions, with each portion tailored for its facing light emitting component. Each portion has a curvature over the XY plane and acts as a collimator over the XY plane. The second surface has a curvature only on the YZ plane and acts as a collimator on the YZ plane.

The system further comprises light emitting components such as lasers, Light Emitting Diodes (LEDs), microLEDs that are micro-emitters (made for example with gallium nitride (GaN) technology), or OLEDs (i.e. Organic Light Emitting Diodes) that correspond to the optical lens subsystem. Where the illuminator includes more than one optical lens subsystems, the illuminator includes first light emitting components that correspond to a first optical lens subsystem and second light emitting components that correspond to the second optical lens subsystem. The first light emitting components project first light beams and the second light emitting components project second light beams. Each light emitting component or group of light emitting components is shifted along the Y axis by different amounts, which results in exiting beams with different tilts. Therefore, a first subset of the first light emitting components is offset relative to a center of the first optical lens subsystem such that the first subset of the first light emitting components project a first subset of the first light beams where the first subset of the first light beams illuminate a FoV that is at a location between a near field and a far field, where an irradiance at the FoV is within a range for all locations between the near field and the far field. A second subset of the light emitting components is offset relative to a center of the second optical lens subsystem such that the second subset of the second light emitting components project a second subset of the second light beams where the second subset of the second light beams illuminate a FoV that is at a location between a near field and a far field, where an irradiance at the FoV is within a range for all locations between the near field and the far field. The overall or total irradiance at the FoV, which is the sum of the irradiances of the subsystems, is kept within an overall range by the irradiances of the subsystems being within a range for all locations between the near field and far field.

In a second aspect of the disclosure, a scanner is provided. The scanner comprises an optical receiving system and an illuminator. The optical receiving system receives light. The illuminator includes at least one optical lens subsystem positioned in proximity to the optical receiving system. The illuminator includes light emitting components or groups of light emitting components that correspond to the optical lens subsystem. A first light emitting components corresponding to a first optical lens subsystem project first light beams and a second light emitting components corresponding to a second optical lens subsystem project second light beams. Each light emitting component or group of light emitting components is shifted along the Y axis by different amounts, which results in exiting beams with different tilts. Therefore, a first subset of the first light emitting components is offset relative to a center of the first optical lens subsystem such that the first subset of the first light emitting components project a first subset of the first light beams where the first subset of the first light beams illuminate a FoV that is at a location between a near field and a far field, where an irradiance at the FoV is within a range for all locations between the near field and the far field. A second subset of the second light emitting components is offset relative to a center of the second optical lens subsystem such that the second subset of the second light emitting components project a second subset of the second light beams where the second subset of the second light beams illuminate a FoV that is at a location between a near field and a far field, wherein an irradiance at the FoV is within a range for all locations between the near field and the far field. As a result of the irradiances of the subsystems being within a range, the total irradiance is kept within range.

In a third aspect of the disclosure, a method of providing illumination for a scanner is provided. The method comprises receiving light by an optical receiving system; positioning an illuminator that includes a first optical lens subsystem in proximity to the optical receiving system. In some embodiments, the illuminator may include a second optical lens subsystem. The first optical lens subsystem corresponds to first light emitting components that project first light beams and, where applicable, the second optical lens subsystem corresponds to second light emitting components that project second light beams. The method includes offsetting a first subset of the first light emitting components relative to a center of the first optical lens subsystem and, where applicable, offsetting a second subset of the second light emitting components relative to a center of the second optical lens subsystem. Each light emitting components or group of light emitting components is shifted along the Y axis by different amounts, which results in exiting beams with different tilts. Thus, the method includes the first subset of the first light emitting components projecting a first subset of the first light beams such that the first subset of the first light beams illuminate a FoV that is at a location between a near field and a far field, where an irradiance at the FoV is within a range for all locations between the near field and the far field and projecting by the second subset of the second light emitting components, second subset of the second light beams where the second subset of the second light beams illuminate a FoV that is at a location between a near field and a far field, wherein an irradiance at the FoV is within a range for all locations between the near field and the far field.

In a fourth aspect of the disclosure, a scanner is provided. The scanner comprises an optical receiving system and an illuminator. The optical receiving system receives light. The illuminator includes an optical lens subsystem positioned in proximity to the optical receiving system. The illuminator includes light emitting components that correspond to the optical lens subsystem. The light emitting components emit light beams. The optical lens subsystem is positioned in front of the light emitting component and projects the light beams to a FoV of the optical receiving system. The optical lens subsystem comprises a first optically active surface and a second optically active surface. The first optically active surface is curved or tilted such that a beam of light emitting from the light emitting components illuminate, via the optical lens subsystem, a FoV that is at a location between a near field and a far field, where a total irradiance at the FoV is within a range for all locations between the near field and the far field.

In a fifth aspect of the disclosure, a scanner is provided. The scanner comprises an optical receiving system and an illuminator. The optical receiving system receives light. The illuminator includes an optical lens subsystem positioned in proximity to the optical receiving system. The illuminator includes light emitting components that correspond to the optical lens subsystem. The light emitting components project light beams. The optical lens subsystem is positioned in front of the light emitting component and projects the light beams to a FoV of the optical receiving system. The optical lens subsystem comprises a first optically active surface and a second optically active surface. The second optically active surface is curved or tilted such that a beam of light emitting from the light emitting component illuminate, via the optical lens subsystem, a FoV that is at a location between a near field and a far field, where a total irradiance at the FoV is within a range for all locations between the near field and the far field.

In contrast to conventional systems, such as those described above, the present invention includes an illumination system in which the emission direction over the YZ plane of each light emitting component is optimized to deliver an irradiance that is kept within a limited range at all locations between the near field and the far field. These implementations remove post design manipulation of the lens from the irradiance tailoring and achieve the desired irradiance by either offsetting the light emitting components, tilting/curving the input surface of the lens, tilting/curving the exiting surface of the lens, or a combination thereof. Therefore, adjustments for irradiance after the lens is created are done by modifying the layout of the light emitting components, such as LED layout on their Printed Circuit Board (PCB), which is more convenient and cost effective than re-making the lens.

BRIEF DESCRIPTION OF THE DRAWINGS

Systems, apparatus, and methods for multi source illuminator with optimized light projection are described in detail below with reference to the attached drawing figures, wherein:

FIG. 3a-b depict an illustration of an exemplary arrangement of light emitting components and an optical lens subsystem, in accordance with an embodiment of the present disclosure;

DETAILED DESCRIPTION

Figure 1:
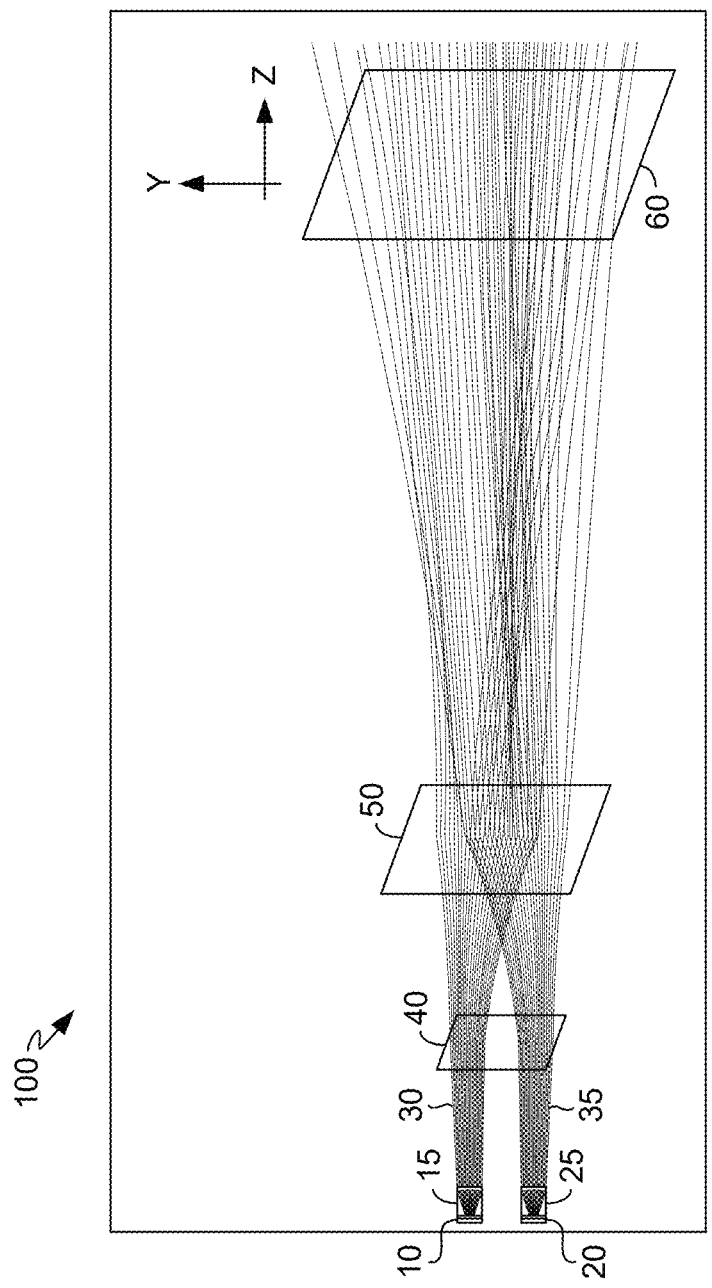
FIG. 1 depicts an exemplary illustration of a scanner in the current state of the art.

Systems, apparatus, and methods are disclosed that are related to multi-source illuminator with optimized projection of light beams to the near field and the far field.

The subject matter of the present disclosure is described with specificity herein to meet statutory requirements. However, the description itself is not intended to limit the scope of the technology. Rather, the claimed subject matter may be embodied in other ways, to include different elements, steps, and/or combinations of elements or steps, similar to the ones described in this disclosure, and in conjunction with other present or future technologies. Moreover, although the terms "step" and "block" may be used herein to connote different elements of various methods employed, the terms should not be interpreted as implying any particular order among or between various steps or blocks unless and except when the order of individual steps or blocks is explicitly described and required.

At a high level, the present disclosure relates generally to a scanner configured to provide multi-source illumination with optimized illumination for scanning. More specifically, an exemplary scanner may include an optical receiving system and an illuminator including at least one optical lens subsystem and corresponding light emitting components. Another type of scanner may have at least two optical lens subsystems. Where the illuminator includes at least two optical lens subsystem the optical lens subsystems may be arranged in any order. For example, the at least two optical lens subsystems may or may not be symmetrically positioned with respect to the optical receiving system. Furthermore, the at least two optical lens subsystems may or may not be symmetric such that when they are symmetric the optical lens systems are equal, same, or identical. The optical lens subsystems may or may not contain the same parts or may or may not be mirror images of each other. The optical lens subsystems may or may not be made of similar parts facing each other, located around an axis, or placed in parallel. The light emitting components may include LEDs or other light sources including lasers or micro LEDs. The light emitting components or LEDs may be arranged in, assembled in, or formed a group or an array. The array or group may include a collection of similar or non-similar light emitting components or a plurality of light emitting components in a particular manner. The light emitting components may be offset relative to the linear center of a corresponding optical lens subsystem to project light beams that illuminate a FoV that is at a location between a near field and a far field with an irradiance at the FoV that is within a certain range for all distances for the FoV. The offset is typically a perpendicular distance from an imaginary line (e.g. linear center) that runs through the center of the optical lens subsystem. The near field is considered a location that is closer or nearer to the lens subsystem relative to the far field, which is a location farther away from the lens subsystem when the lens subsystem, near field, and far field are evaluated on a linear axis. The light emitting diode components or LEDs may be arranged in an array. As such, the exemplary embodiments are described in detail below with reference to FIGS. 1-17.

Irradiance may be an amount of light or other radiant energy that strikes an area of a surface. In some embodiments, the irradiance may be measured in Watts per square centimeter, but can also be measured with other units. Simply put, irradiance is the intensity of energy on a surface. In embodiments of the public disclosure, the goal is to achieve irradiance that is within a range from the near field FoV to the far field FoV. This irradiance may be uniform, substantially similar, within a band, within a tolerance, close to a target, or may be above or below a predetermined threshold. The range may be predetermined and/or pre-arranged. Correspondingly, the irradiance may correlate to the amount of power at a surface or FoV. For example, the power, which can be measured in Watts, from any distance ranging from the near field to the far field, may be uniform, substantially similar, with a band, with a tolerance, or close to a target power.

Embodiments of the present disclosure may be embodied as, among other things, a method, a system, or an apparatus. Accordingly, the embodiments may take the form of a hardware embodiment, or an embodiment combining software and hardware. The present disclosure may take the form of a computer-program product that includes computer-useable instructions embodied on one or more computer-readable media. The present disclosure may further be implemented as being hard-coded into a mechanical design of scanning components, may be built into a scanner, and/or may be integrated into a scanning system including one or more computing or processing components.

Computer-readable media includes both volatile and non-volatile media, removable and non-removable media, and contemplate media readable by a database, a switch, and/or various other network devices. Network switches, routers, and related components are conventional in nature, as are methods of communicating with the same. By way of example, and not limitation, computer-readable media may comprise computer storage media and/or non-transitory communications media. Computer storage media, or machine-readable media, may include media implemented in any method or technology for storing information. Examples of stored information include computer-useable instructions, data structures, program modules, and other data representations. Computer storage media may include, but are not limited to, RAM, ROM, EEPROM, flash memory or other memory technology, CD-ROM, digital versatile discs (DVD), holographic media or other optical disc storage, magnetic cassettes, magnetic tape, magnetic disk storage, and/or other magnetic storage devices. These memory components may store data momentarily, temporarily, and/or permanently, and are not limited to the examples provided.

Figure 9:
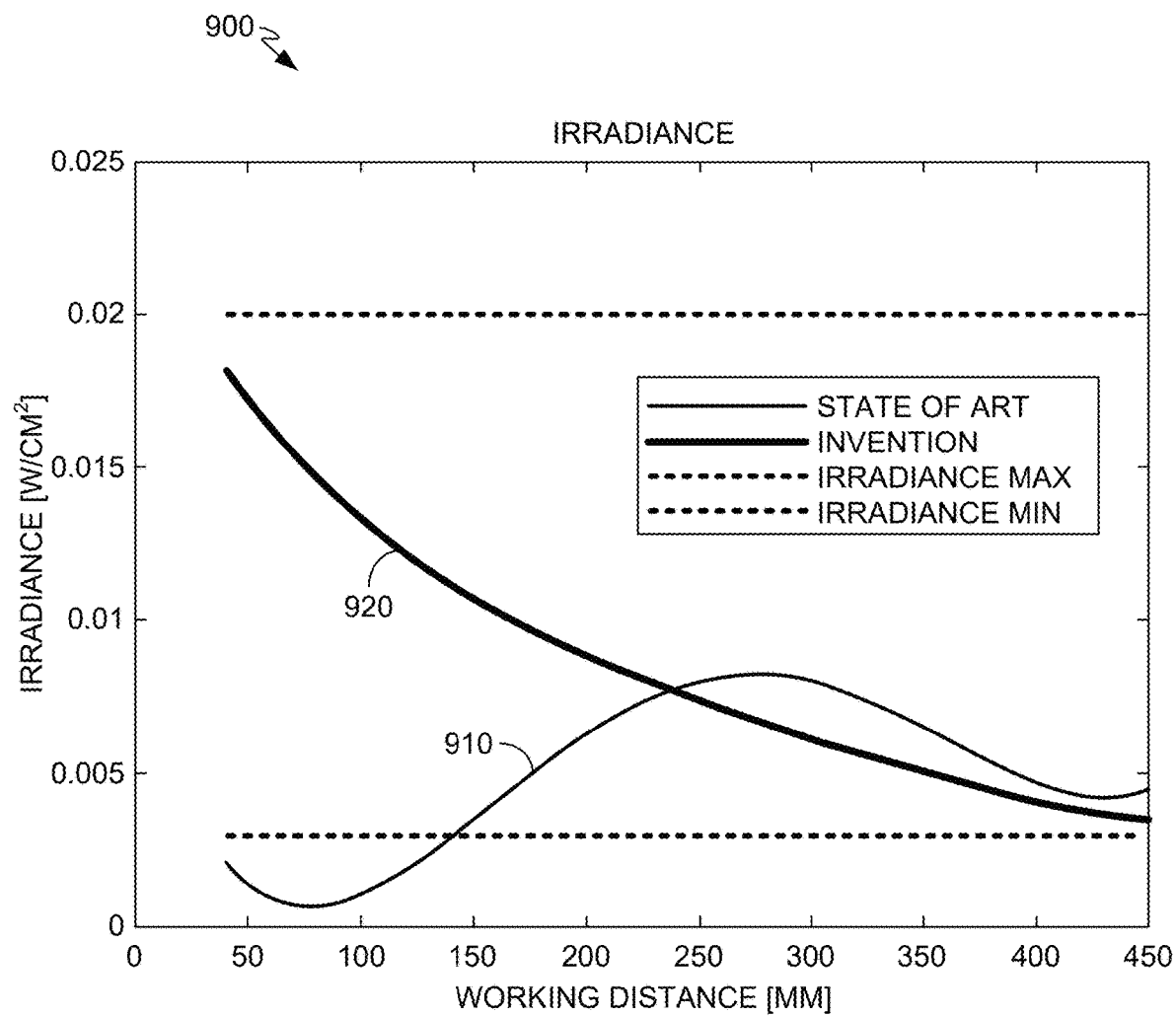
FIG. 9 is a graph of the Irradiance at various distances for the state of the art technology and for the present disclosure.

Referring to FIG. 1, an exemplary illustration of the illumination of the existing state of the art technology 100 is provided. Optical lens subsystems 10 and 20 emit light beams 30 and 35 to concentrate light in the far field 60. Locations 40, 50, and 60 are at various distances within the FoV. Each of optical lens subsystems 10 and 20 consist of only one lens, lens 15 and 25 respectively, which project the light to the far field. At shorter distances, such as distances 40 and 50, the irradiance may be too much or too little. FIG. 9 shows a graph 900 comparing the measured irradiance, optical power per surface unit, at various distances for the existing state of the art technology and the present invention. Specifically, FIG. 9 shows that at short distances the irradiance for the pre-existing state of the art technology 910 is below the desired minimum irradiance, resulting in an illumination that is too low or has too little power.

Figure 10:
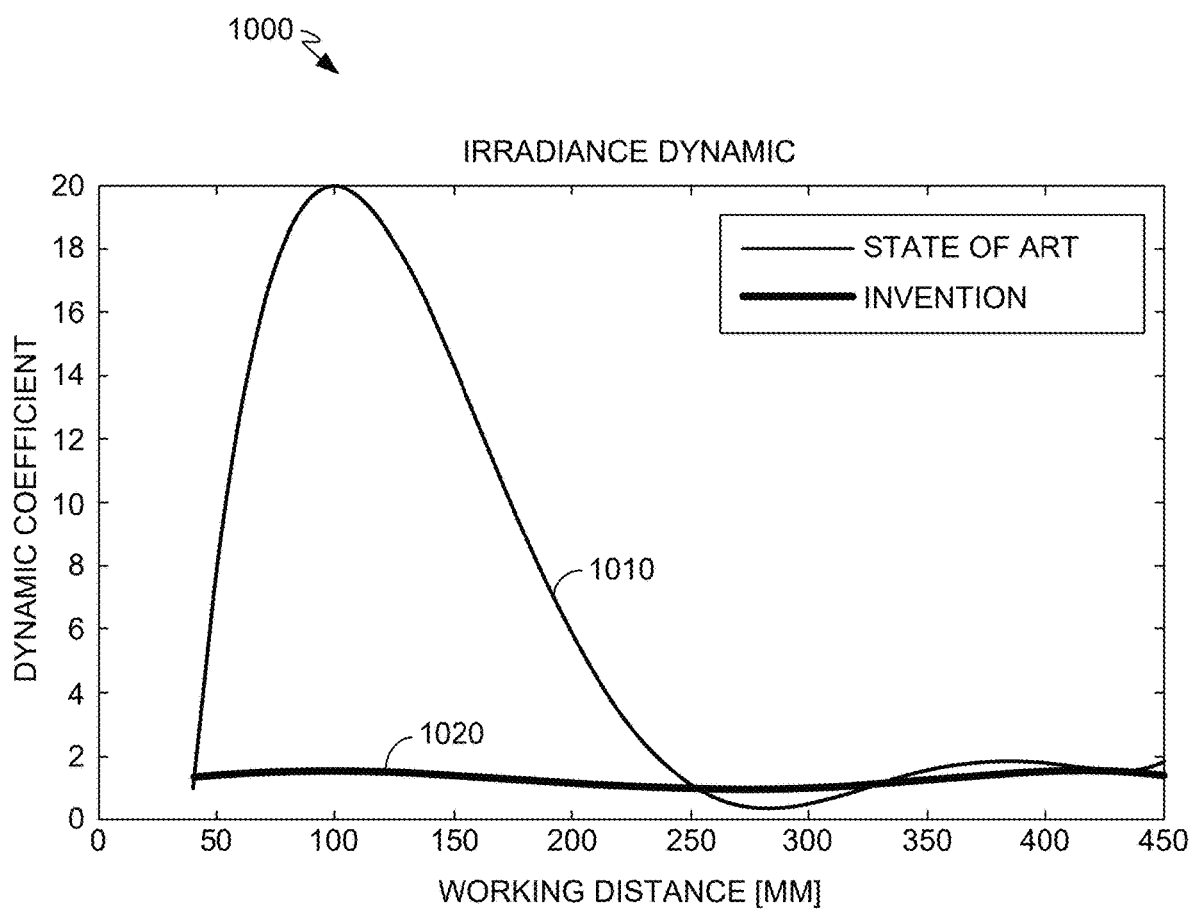
FIG. 10 is a graph of the Irradiance Dynamic at various distances for the state of the art technology and for the present disclosure.
Figure 17:
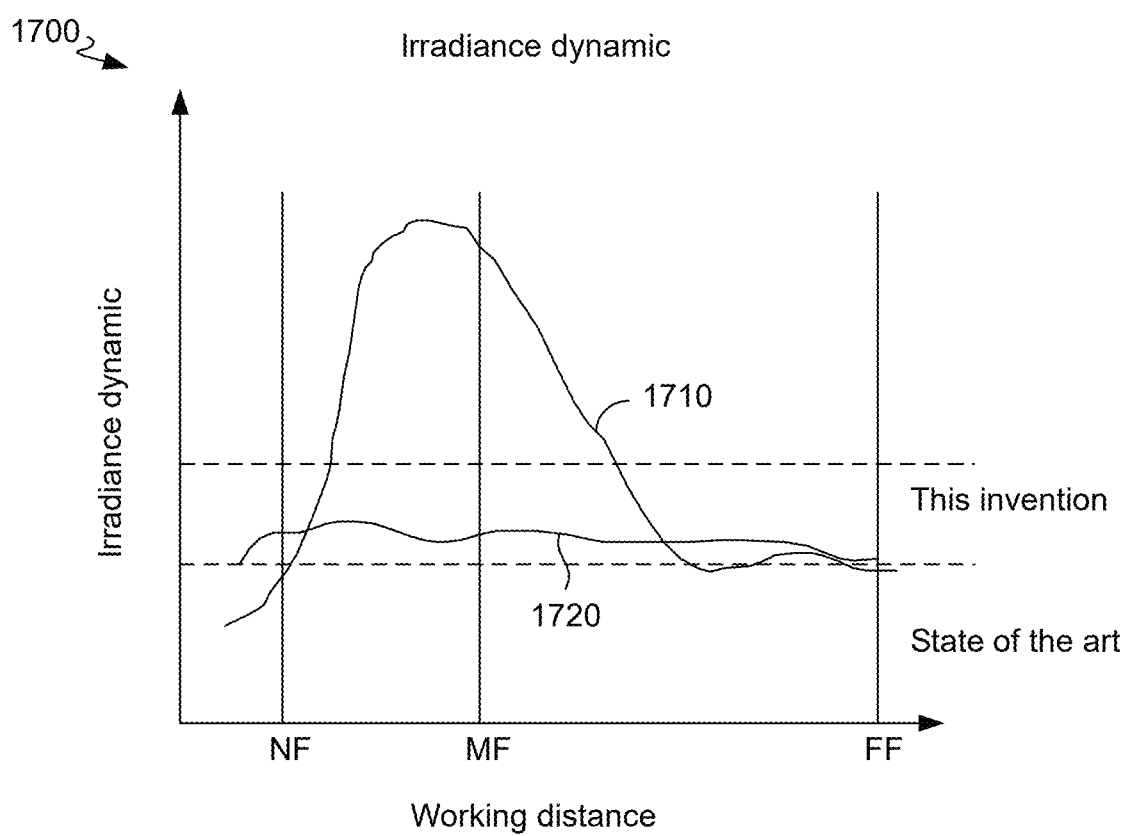
FIG. 17 depicts a graph of the Irradiance Dynamic at the near field, medium field, and far field for the prior art technology and for the present disclosure.

The present invention provides an illumination system in which the emission direction over the YZ plane of each light emitting component, such as LED, is optimized to deliver irradiance that is kept within a range at all distances and is as uniform as possible over the FoV of the optical receiving system from the near field to the far field. As FIG. 9 shows, the irradiance for the present invention 920 stays within the range of minimum irradiance and maximum irradiance between approximately 0.003 W/cm$^2$ and 0.025 W/cm$^2$ for all distances between 50 millimeter (mm) and 450 mm. Uniformity is defined by the dynamic coefficient as max irradiance/min irradiance over the given working distance. FIG. 10 shows a graph 1000 of the Irradiance Dynamic as measured for the pre-existing state of the art technology 1010 spikes between 50 mm and 250 mm while the Irradiance Dynamic as measured for the present invention 1020 stays relatively constant from 50 mm to 450 mm. Furthermore, as FIG. 17 shows, irradiance (optical power per unit surface) and dynamic have large variability over distance, as shown by the state of art in line 1710. In comparison, irradiance and dynamic are fairly flat over distance, as shown by the invention in line 1720. For example, as shown in line 1710, in the very near field (NF), irradiance is very low; the irradiance spikes sharply in the medium field (MF) and decreases at the far field. As such, the goal of uniform irradiance is not met.

The present invention may implement embodiments to achieve this relatively constant irradiance in the following methods:

Method A. Offset each light emitting component with respect to the optical lens subsystem.

Method B. Tilt/curve the surface portions of the first active surface of the lenses.

Method C. Tilt/curve the surface portions of the second active surface of the lenses Method D. A combination of Method A and/or Method B and/or Method C.

Figure 6:
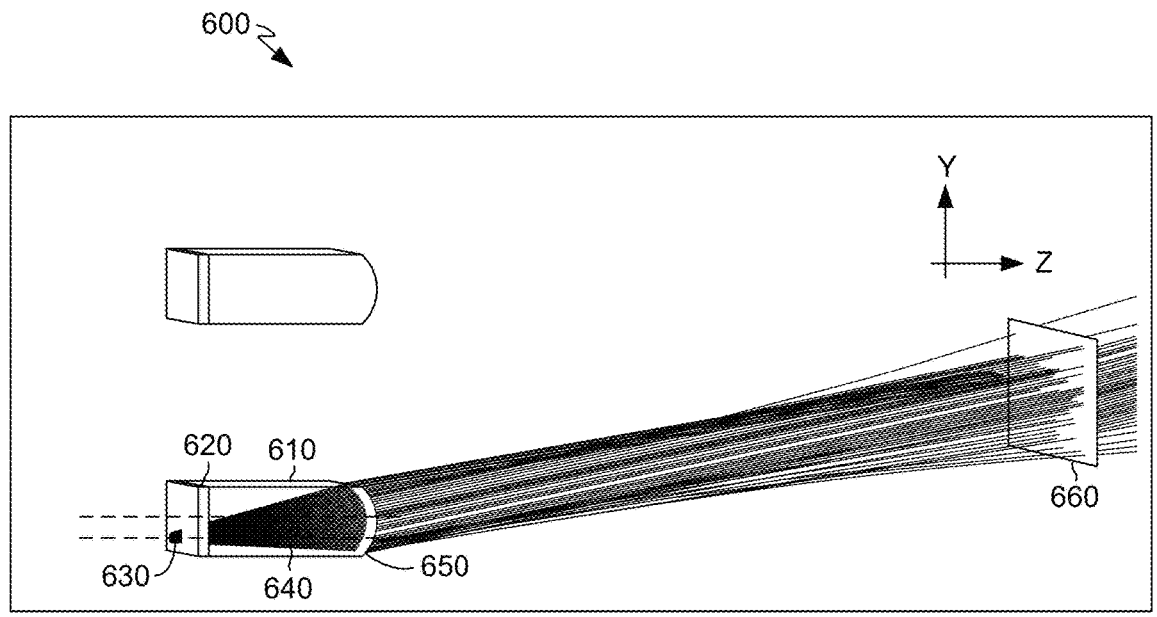
FIG. 6 depicts an illustration of an exemplary arrangement of offset light emitting components emitting light beams to a FoV in accordance with an embodiment of the present disclosure.

Turning now to FIG. 6, FIG. 6 demonstrates the implementation of Item A above. FIG. 6 illustrates an illuminator 600 consisting of optical lens subsystems including an optical lens subsystem 610, an optically active surface 620, a light emitting component, preferably a LED 630, a light beam 640, an optically active surface 650, and a distance 660. Optically active surface 620 is one optically active surface of optical lens subsystem 610 and optically active surface 650 is another optically active surface of optical lens subsystem 610. LED 630 is offset relative to the center of optically active surfaces 620, 650 and optical lens subsystem 610. As a result, light beam 640 exiting optically active surface 650 is tilted to illuminate the nearest FoV, and irradiance is within range at distance 660. Offsetting the LED is easier to adjust than changing the lens. Another beam from another LED (not shown) may be offset to project light to other distances within the FoV.

Figure 7:
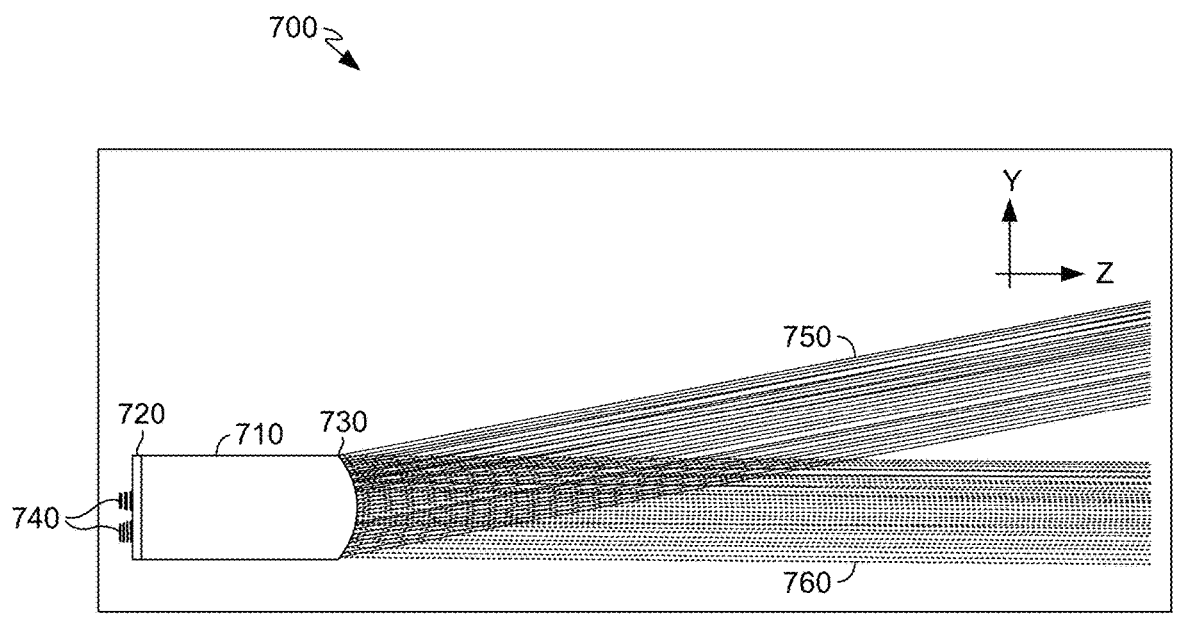
FIG. 7 depicts an illustration of how exemplary light emitting components at varying offsets illuminate the FoV in accordance with the present disclosure.

In FIG. 7, an illustration 700 of a further implementation of Item A is shown with optical lens subsystem 710. FIG. 7 demonstrates how different offsets generate different tilts of the light beams exiting the second active surface of the lens. Optically active surface 720 is the first optically active surface of optical lens subsystem 710 and optically active surface 730 is the second optically active surface of optical lens subsystem 710. Optically active surface 720 is positioned in front of light emitting components 740. Turning briefly to FIG. 16a, an illustration 1600 shows possible paths of the light beams exiting the optical lens subsystem. Optical lens subsystem 1620 has optically active surfaces 1622 and 1624. Optical lens subsystem 1620 is positioned in front of light emitting components 1610 and 1615, which projects light beams 1635 and 1630 respectively. Light emitting component 1615 is located at the center of optically active surface 1622 of optical lens subsystems 1620. Light beam 1630, which is emitted from light emitting component 1615, is projected to the far field of the FoV. Light emitting component 1610 is offset relative from the center of optically active surface 1622 and optical surface lens subsystems 1620. Light beam 1635, which is emitted from light emitting component 1610, is projected to nearer field of the FoV. Returning to FIG. 7, there may be curvatures in portions of optically active surface 720. Each curvature corresponds to a light emitting component. The curvatures may be adjusted during design to modify the light beams received from corresponding light emitting component. Therefore, the curvatures are adjusted to project the light beam of each light emitting component such that the light beams 750 and 760 are projected to various distances in the FoV with irradiances that are within range. The light emitting components may be adjusted during implementation to correspond to the desired curvature to achieve the irradiance at a particular distance.

Figure 8:
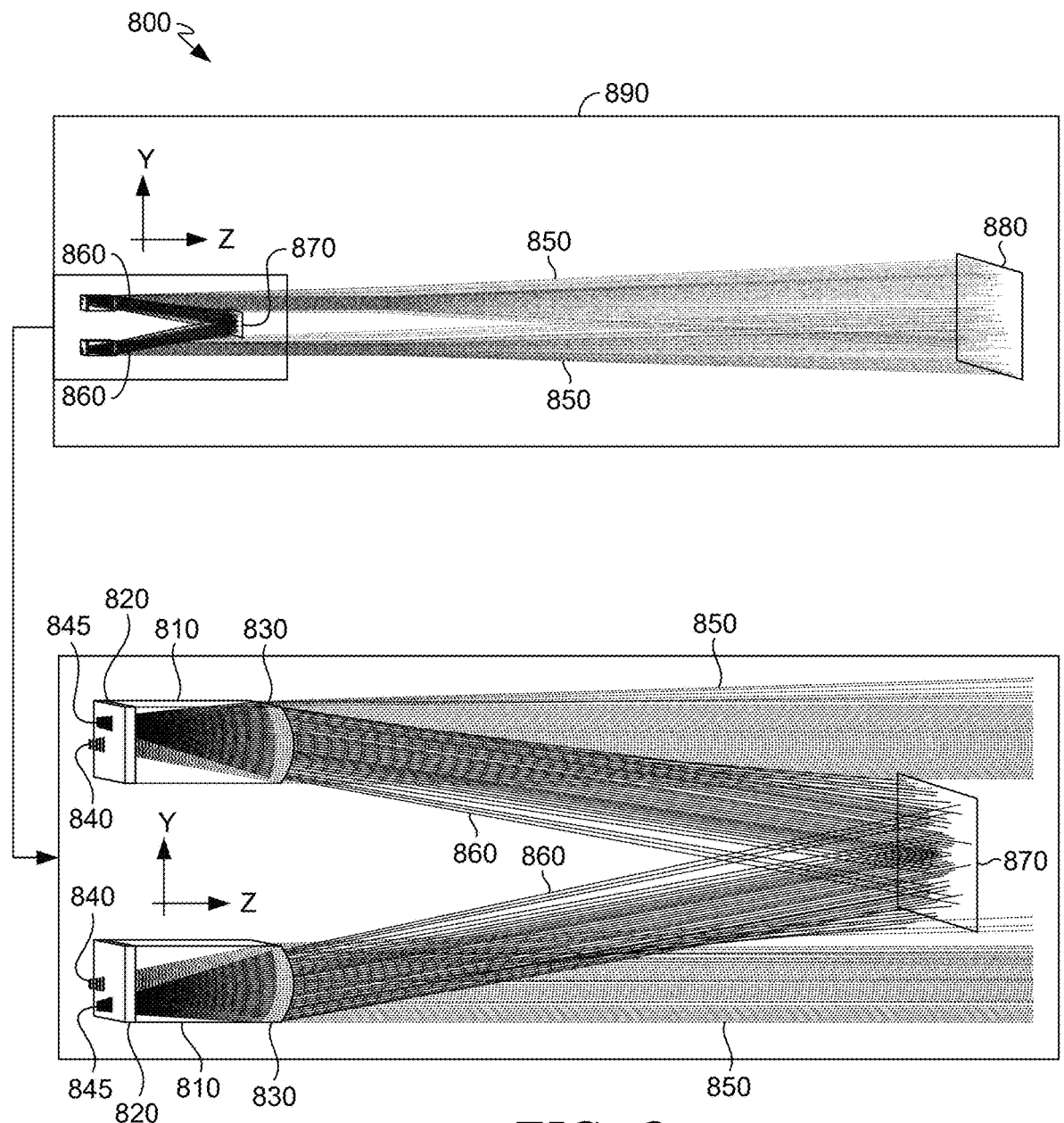
FIG. 8 depicts an illustration of an exemplary arrangement of light emitting components and optical lens subsystems emitting light beams at varying distances within the FoV in accordance with an embodiment of the present disclosure.

FIG. 8 demonstrates the implementation of Items A in an illuminator 800 with an exemplary arrangement of light emitting components and optical lens subsystems emitting light beams at varying distances within the FoV. Optical lens subsystems 810 have optically active surfaces 820 and 830. Optically active surface 820 is positioned in front of light emitting components 840 and 845. Light emitting components 845 are offset relative from the center of optically active surfaces 820, 830 and optical lens subsystems 810. The light beams from light emitting components 840 and 845 are projected via optical lens subsystems 810 to various distances. Light beams 860 from light emitting components 845 are projected to the near field 870 and light beams 850 are projected to the far field 880 as shown in inset 890 that show the FoV continuum. The details and arrangements of the technology in the present invention to achieve these results is described below in FIGS. 2-5.

Figure 2:
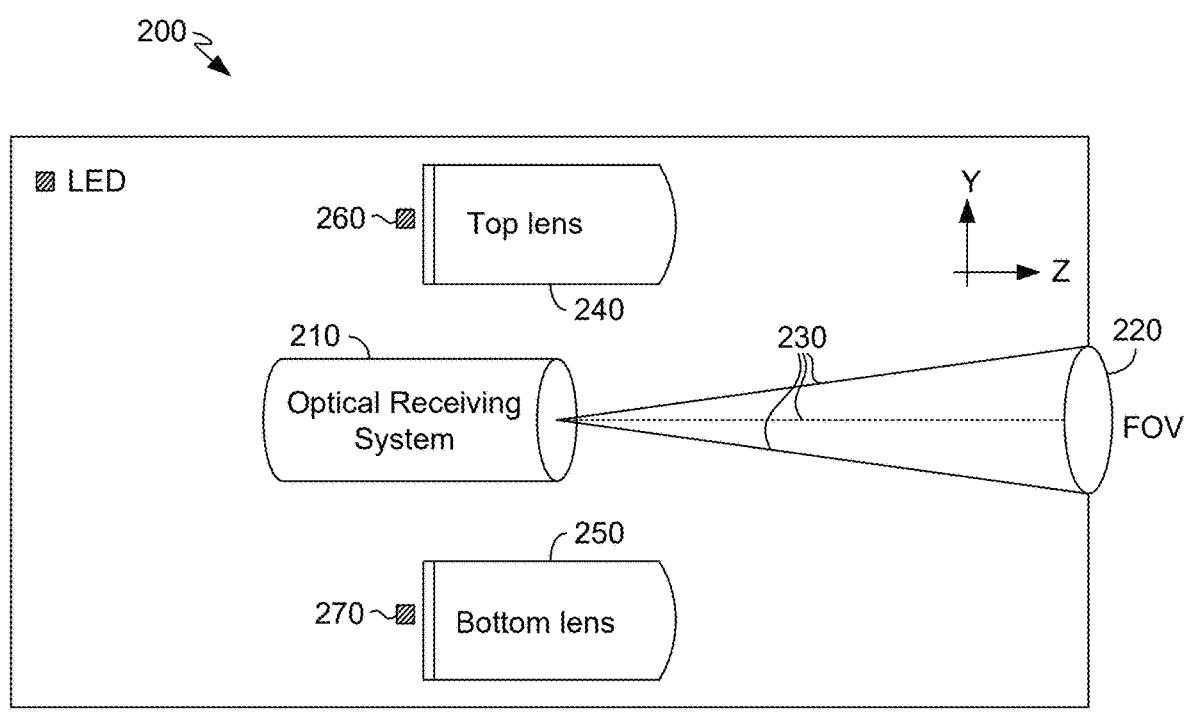
FIG. 2 depicts an illustration of a system with an exemplary scanner, in accordance with an embodiment of the present disclosure.

Turning to FIG. 2, a system of an exemplary scanner 200 is provided, in accordance with an embodiment of the present invention. The system comprises an optical receiving system 210 for receiving light 230 over a FoV at a scanned surface 220. The light 230 is received when it is reflected from the scanned surface 220 illuminated with an irradiance that is within a particular range. An illuminator consisting of optical lens subsystems 240 and 250 is positioned in proximity to optical receiving system 210. Optical lens subsystems 240 and 250 may be symmetric and may be positioned symmetrically about the optical receiving system 210. Each optical lens subsystem 240 or 250 corresponds to light emitting components 260 or 270. The light emitting component may be an array of LEDs on a PCB or any other suitable light emitting component including a plurality of light sources.

Referring to FIG. 3a-b, an exemplary arrangement 300 of light emitting components corresponding to an optical lens subsystem is provided. Optical lens subsystem 310 is similar to optical lens subsystems 240 and 250 of FIG. 2. As shown in FIG. 3a, optical lens subsystem 310 is positioned in front of light emitting components that are arranged in an array 320. Briefly turning to FIG. 3b, a depiction of an exemplary arrangement 350 of a light emitting component 320a corresponding to light emitting components 320 (in FIG. 3a) of optical lens subsystem 310 (in FIG. 3a) is provided. Optically active surface 330 is an input surface for light emitting from light emitting components 320. Optically active surface 340 is an output surface, which is away from light emitting components 320. The surface has cylindrical curvature over the YZ plane to provide collimation on the YZ plane. In an embodiment, optically active surface 340 may be divided into portions. However, another embodiment, optically active surface may not be divided into portions.

Figure 11:
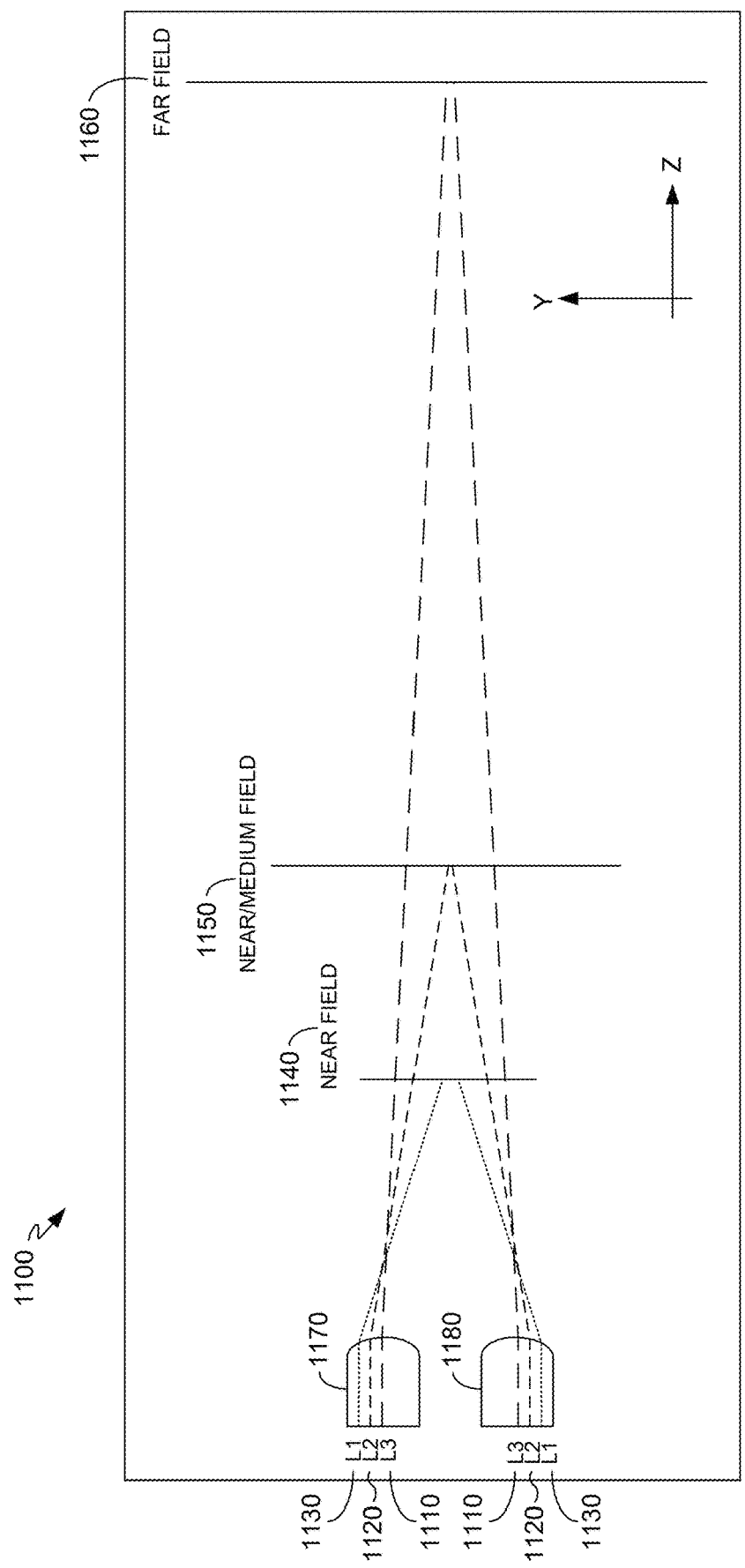
FIG. 11 depicts the system of FIG. 8 emitting light beams in accordance with an embodiment of the present disclosure.

Returning to FIG. 3a, optical lens subsystem 310 has optically active surfaces 330 and 340. Optically active surface 340 is an exit surface. In some embodiments, optically active surface 340 may be a single exit surface. Optically active surface 330 has multiple input surfaces shaped for each light emitting component. Each surface portion has curvature over the XZ plane to provide collimation to each light emitting component's light on the XZ plane. The surfaces portions may be adjusted to optimize the irradiance at the distance that is relevant for corresponding light emitting components or groups of light emitting components. The multiple input surfaces may be arranged in groups. In an embodiment, there are three groups of shapes. For instance, each group of the multiple input surfaces may have different curvatures. Three groups of multiple input surfaces are denoted as groups A, B, and C of optically active surface 330 of optical lens subsystem 310 in FIG. 3a. As FIG. 11 shows in an exemplary illuminator 1100, the light emitting components project light to different distances based on their offset relative to the center of the optical lens subsystem. In FIG. 11, the light emitting components are denoted as L1, L2, and L3 and represent the offset along the Y axis. Light emitting components 1110 corresponds to the center of the optical lens subsystems 1170 and 1180 and project light beams to the far field 1160. Light emitting components 1120 are close to the center of optical lens subsystems 1170 and 1180 and project light to a near/medium field 1150. Light emitting components 1130 are further from the center of optical lens subsystems 1170 and 1180 and project light to the near field 1140. As such, the light emitting components that corresponds to the center of the corresponding optical lens subsystem projects a light beam to the far field and projects to a nearer field as they are offset further from the center. The other light emitting components may be offset relative to a center of the corresponding optical lens subsystem and may project light beams at various distances within the FoV. The FoV may span a distance of 40 mm to 450 mm.

Figure 15:
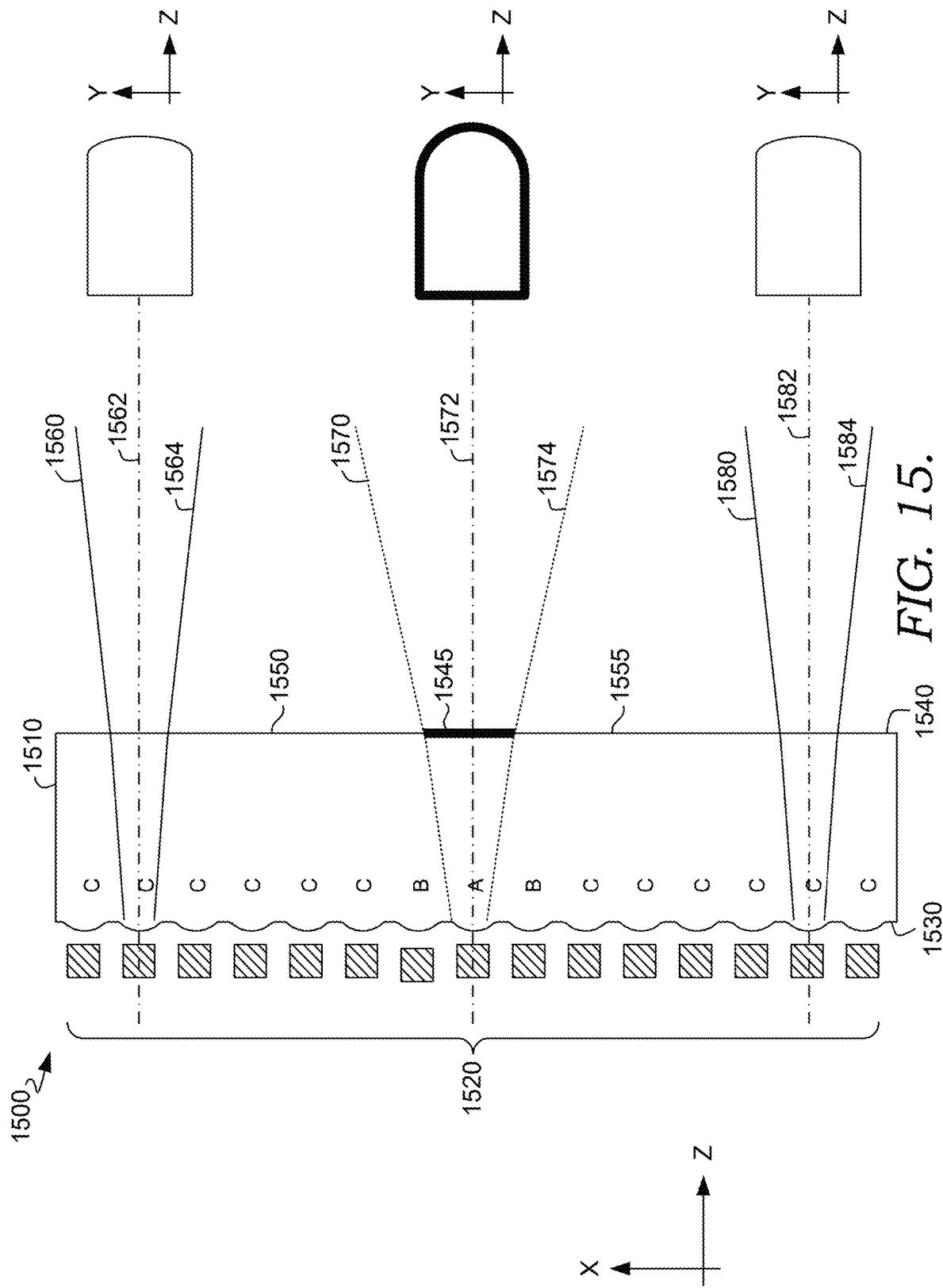
FIG. 15 depicts an illustration of an exemplary arrangement of light emitting components and an optical lens subsystem with curvature on a second active surface, in accordance with an embodiment of the present disclosure.
Figure 16:
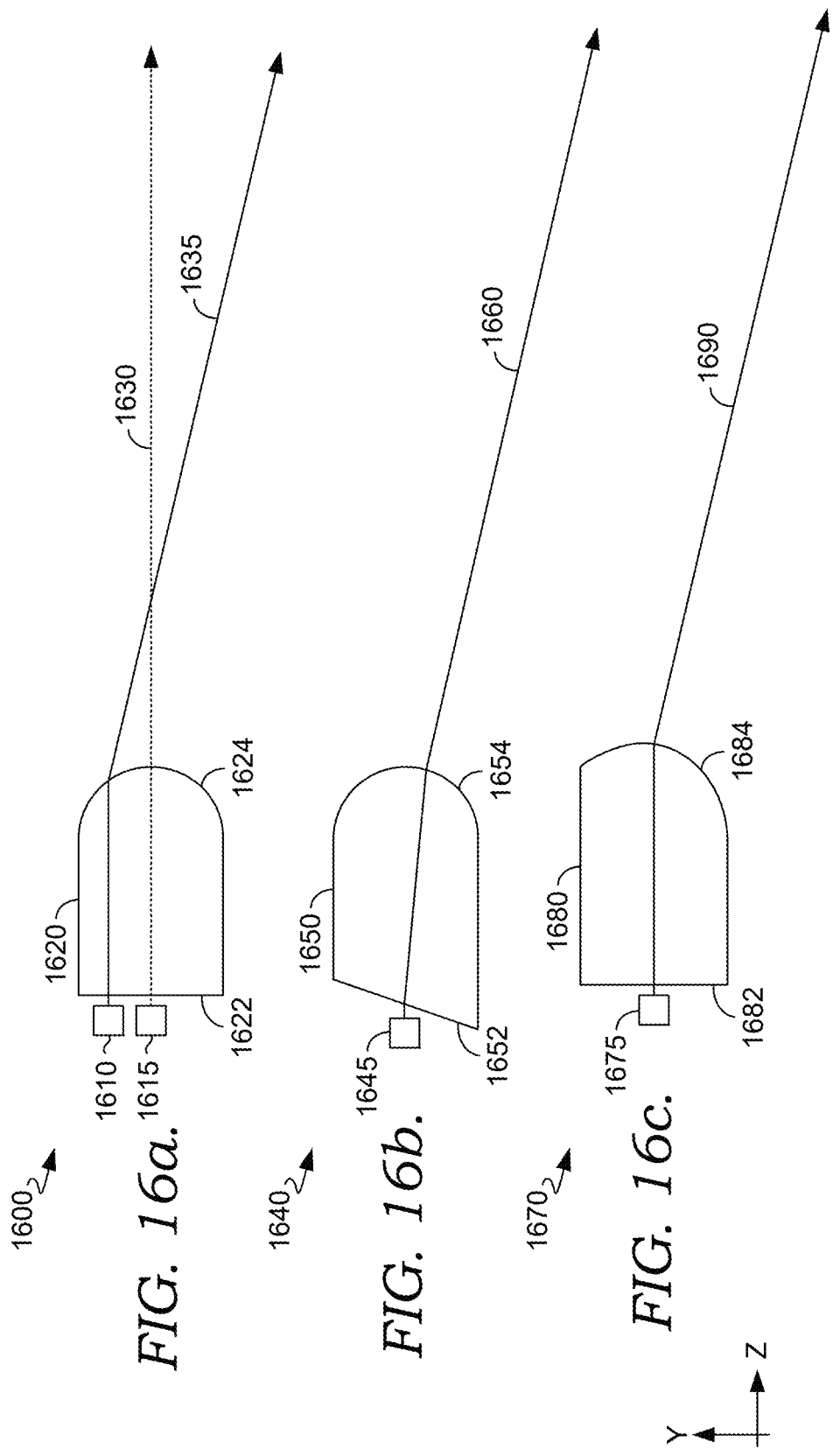
FIGS. 16a-c depict light beams emitting from a light emitting component and projected to a FoV in accordance with various methods of the present disclosure.

In addition to groups of multiple surfaces, the second optically active surface may be divided into portions to optimize the irradiance as show in FIG. 15. Illustration 1500 depicts an arrangement that includes optical lens subsystem 1510. Optical lens subsystem 1510 has optically active surfaces 1530 and 1540. Optically active surface 1530 comprises groups of multiple surfaces such as Group A, Group B, and Group C. Optically active surface 1540 is divided into portions 1545, 1550, and 1555 of different curvature along vertical plane YZ. Light beams 1570, 1572, and 1574 from Group A of light emitting components 1520 are received at the center of optically active surface 1530 into optical lens subsystem 1510 and exit optically active surface 1540 at portion 1545.

Figure 4:
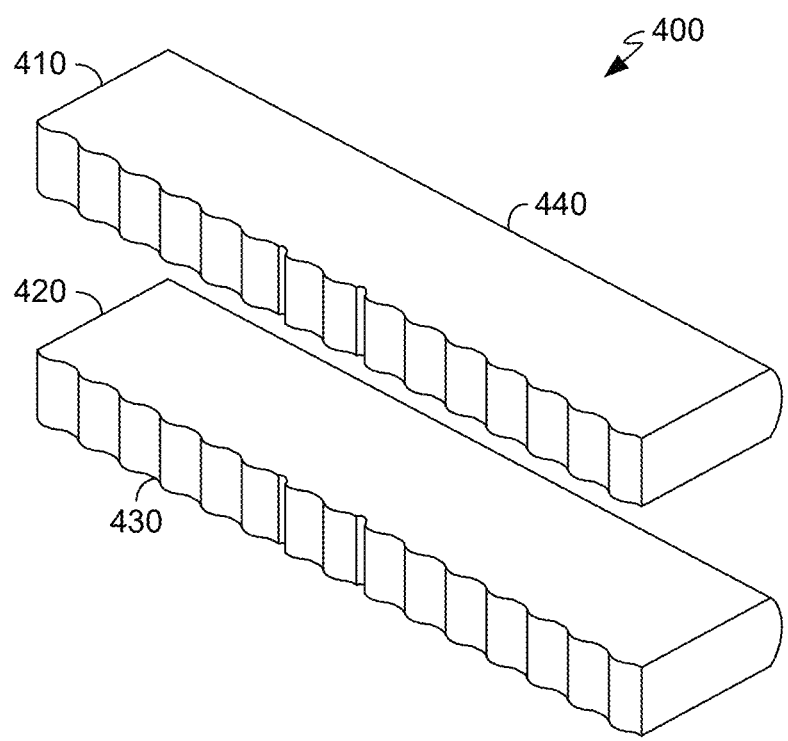
FIG. 4 depicts an illustration of an isometric view of an exemplary optical lens subsystems, in accordance with an embodiment of the present disclosure.

Referring to FIG. 4, an isometric view 400 of an exemplary optical lens subsystems 410 and 420 is provided. Each optical lens subsystem 410 and 420 corresponds to optical lens subsystem 310 of FIG. 3a-b and has more than one optically active surfaces 430 and 440 corresponding to surfaces 330 and 340. Optically active surfaces 430 and 440 provide collimation of the light beams. Optically active surface 430 is located in front of the array of LEDs 320 and consists of several portions that have different curvatures that act as collimators for the LED of array 320 that is in front of the particular portion of optically active surface 430. The collimation is on the horizontal plane (XZ). The surface shape and curvature are optimized to make the irradiance on the FoV as uniform as possible. Optically active surface 430 is cylindrical or arc-shaped i.e., optically active surface has optical power only on the XZ plane and has no curvature over the YZ plane. The curvature of the central portion (A) is flatter than the others, since the central portion must give illumination along the X axis in the near distance, so the beam should be more divergent. The two portions adjacent to the central portion (B), concentrate the power in the near-medium distance and all the other portions (C) operate on far distances. Optically active surface 440 collimates light over the YZ plane to focus in the far field. Optically active surface 440 is cylindrical or arc-shaped and has no curvature on the XZ plane.

Figure 5:
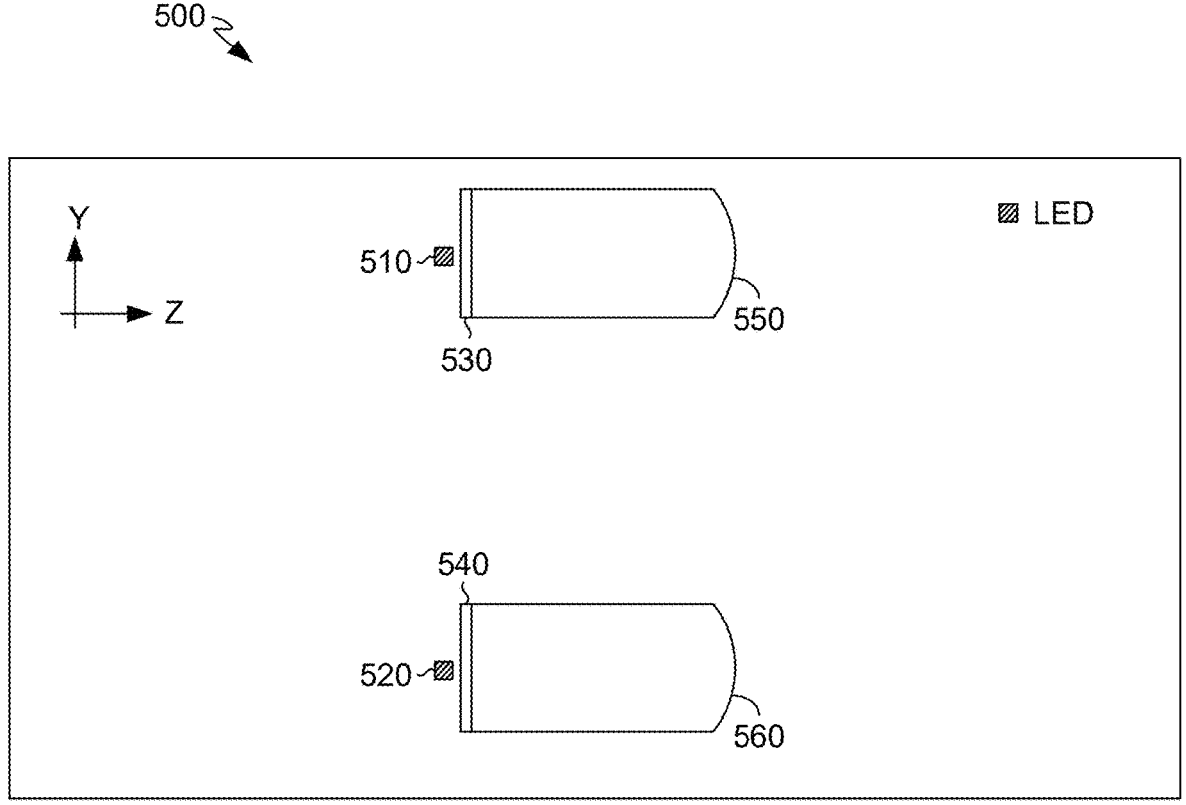
FIG. 5 depicts an illustration of an exemplary arrangement of light emitting components and an optical lens subsystem, in accordance with an embodiment of the present disclosure.

Optically active surface 440 is similar to optically active surfaces 550 and 560 of the illuminator 500 shown in FIG. 5. The light beams of all LEDs of arrays 510 or 520 are collimated in the same way by optically active surface 550 or 560 so that light beams may focused in the far field of the optical receiving system. Optically active surfaces 530 and 540, which are similar to optically active surface 430 of FIG. 4, have no curvature over the YZ plane.

Figure 12:
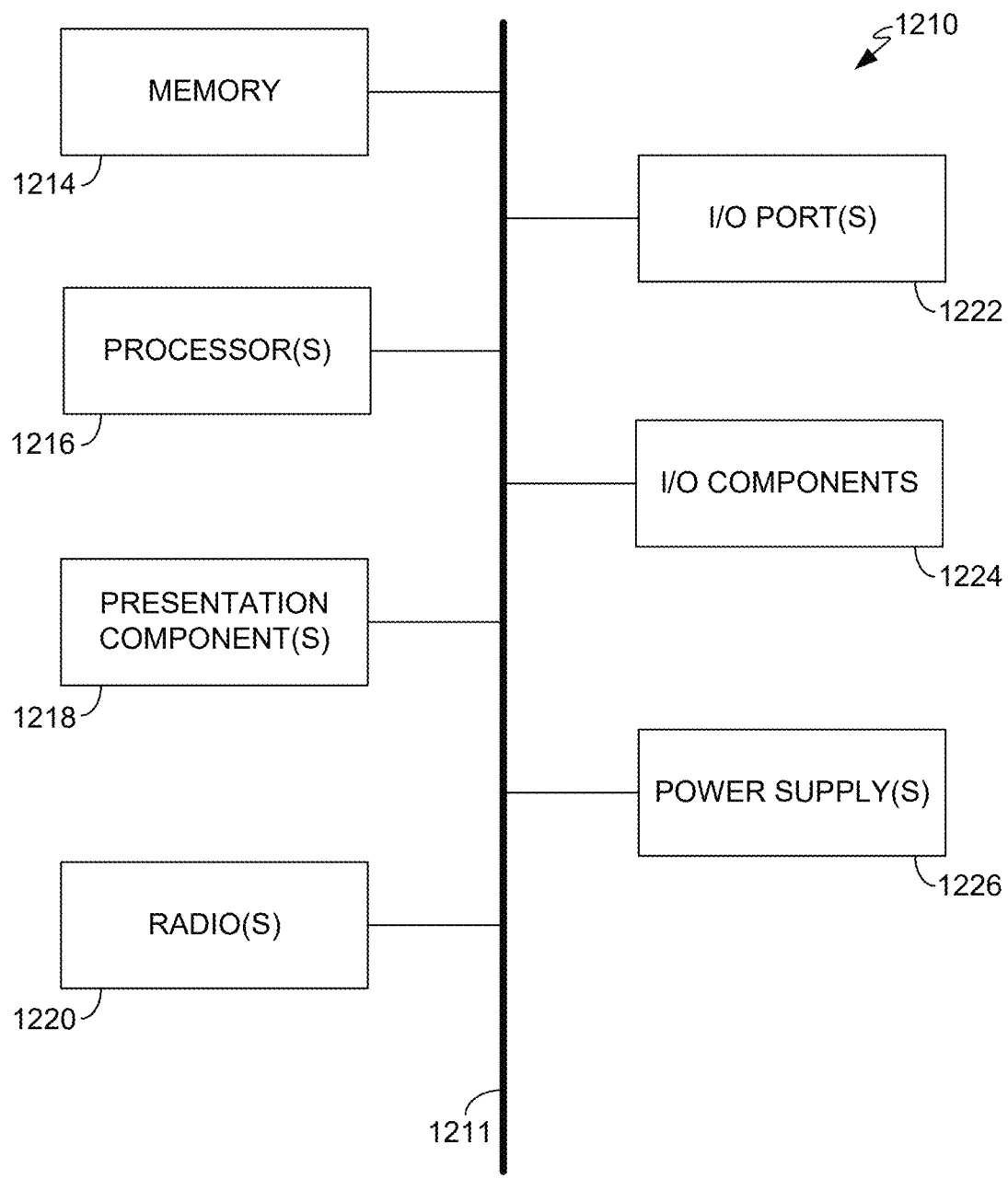
FIG. 12 depicts an exemplary computing system for a scanner in accordance with an embodiment of the present disclosure.

Referring to FIG. 12, a block diagram of an exemplary computing device 1210 for use with a scanner is provided, in accordance with an embodiment of the present disclosure. It should be noted that although some components in FIG. 12 are shown in the singular, they may be plural. For example, the computing device 1210 might include multiple processors or multiple radios. As shown in FIG. 12, computing device 1210 includes a bus 1211 that directly or indirectly couples various components together, including memory 1214, processor(s) 1216, presentation component(s) 1218 (if applicable), radio(s) 1220, input/output (I/O) port(s) 1222, input/output (I/O) component(s) 1224, and a power supply 1226.

Memory 1214 may take the form of memory components described herein. Thus, further elaboration will not be provided here, but it should be noted that the memory 1214 may include any type of tangible medium that is capable of storing information, such as a database. A database may be any collection of records, data, and/or information. In one embodiment, memory 1214 may include a set of embodied computer-executable instructions that, when executed, facilitate various functions or elements disclosed herein. These embodied instructions will variously be referred to as "instructions" or an "application" for short. Processor 1216 may actually be multiple processors that receive instructions and process them accordingly. In addition to other processes, in one embodiment processor 1216 may process image data acquired by the scanner and its related electronics, for the purpose of decoding optical information. Presentation component 1218 may include a display, a speaker, and/or other components that may present information (e.g., a display, a screen, a lamp (LED), a graphical user interface (GUI), and/or even lighted keyboards) through visual, auditory, and/or tactile cues.

The radio 1220 may facilitate communication with a network, and may additionally or alternatively facilitate other types of wireless communications, such as Wi-Fi, WiMAX, LTE, and/or other VoIP communications. In various embodiments, the radio 1220 may be configured to support multiple technologies, and/or multiple radios may be configured and utilized to support multiple technologies.

The input/output (I/O) ports 1222 may take a variety of forms. Exemplary I/O ports may include a USB jack, a stereo jack, an infrared port, a firewire port, other proprietary communications ports, and the like. Input/output (I/O) components 1224 may comprise keyboards, microphones, speakers, touchscreens, and/or any other item usable to directly or indirectly input data into the computing device 1210.

Power supply 1226 may include batteries, fuel cells, or any other component that may act as a power source to supply power to the computing device 1210 or to other scanning components, including through electrical connections or couplings. The power supply 1226 may be configured to selectively supply power to different components independently and/or concurrently.

Figure 13:
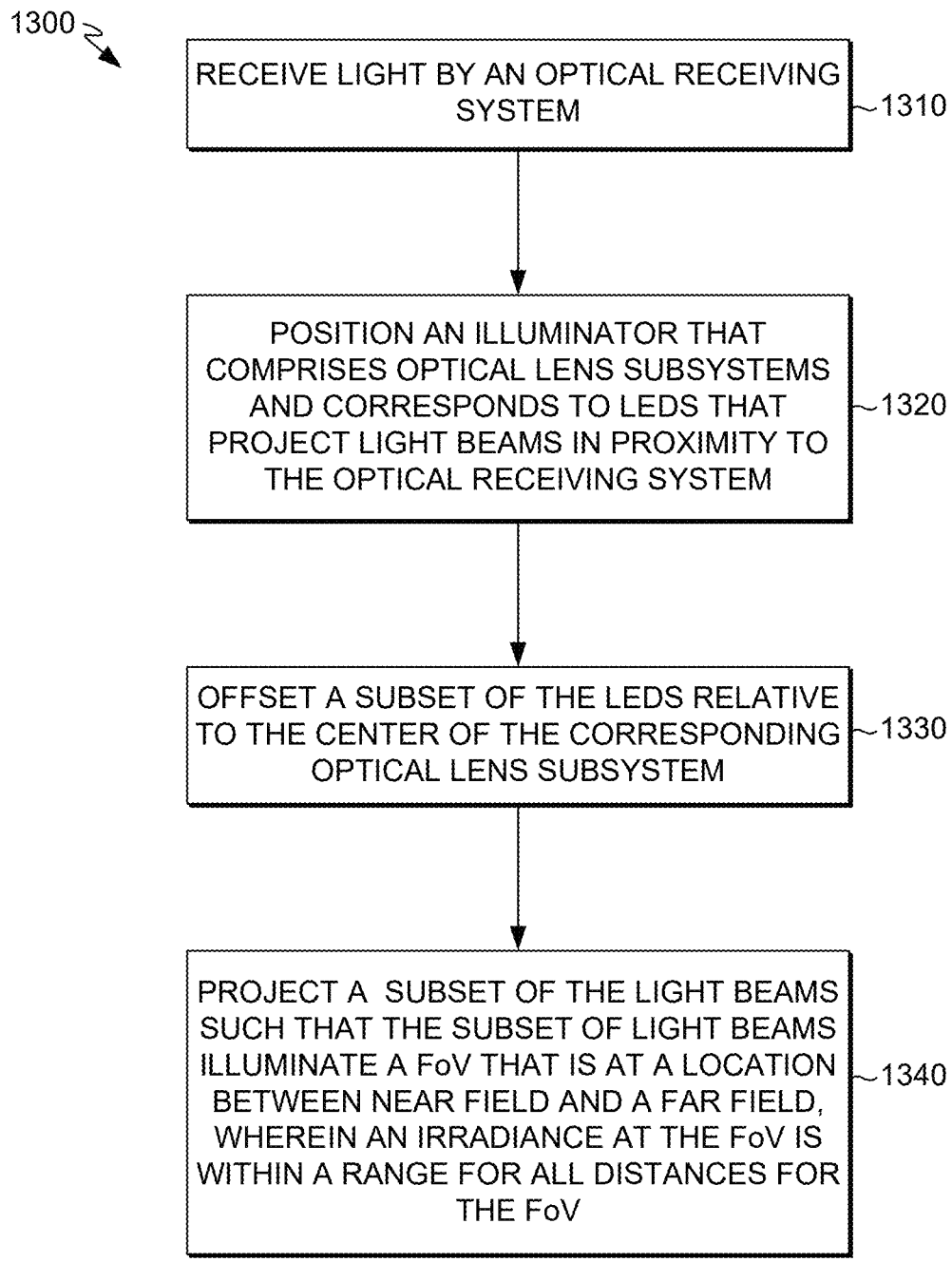
FIG. 13 is a block diagram of an exemplary method of scanning, in accordance with an embodiment of the present disclosure.

Referring to FIG. 13, a block diagram of an exemplary method 1300 of providing illumination for a scanner is provided, in accordance with an embodiment of Method A of the present invention. At a block 1310, light is received by an optical device such as optical receiving system 210 of FIG. 2. The light 230 may be received from FoV at a scanned surface 220. The light 230 is received when light emitted from the optical lens subsystems 240 and 250 is reflected from the scanned surface 220 towards the optical receiving system 210, where the light is collected.

At a block 1320, an illuminator comprising at least two optical lens subsystems, such as optical lens subsystems 240 and 250 of FIG. 2, and corresponding light emitting components, such as LEDs 260 and 270 is positioned in proximity to the optical receiving system 210. In an embodiment, the illuminator may be positioned such that optical lens subsystems 240 and 250 and corresponding LEDs 260 and 270 are symmetrical about the optical receiving system 210 where optical lens subsystem 240 and LEDs 260 are on top of the optical receiving system 210 and optical lens subsystem 250 and LEDs 270 are on the bottom of the optical receiving system 210. In another embodiment, the illuminator may be positioned such that optical lens subsystem 240 and LEDs 260 as well as optical lens subsystem 250 and LEDs 270 are positioned symmetrically about the optical receiving system 210 such that optical lens subsystem 240 and LEDs 260 are on opposite sides of the optical receiving system 210 from optical lens subsystem 250 and LEDs 270. In a third embodiment, the illuminator may be positioned such that optical lens subsystem 240 with LEDs 260 and optical lens subsystem 250 with LEDs 270 are arranged in any other order in proximity to the optical receiving system 210.

At a block 1330, a subset of the LEDs are offset relative to the center of their corresponding optical lens subsystem. An LED may be offset to project light beams in a FoV at a particular location. For instance, the LED may correspond to the center of the optical lens subsystem or may be offset by some distance to the left, right, top, bottom, or at some angle from the center of the optical lens subsystem. The LEDs may be offset to project light beams to different locations.

At a block 1340, a subset of the light beams is projected and emitted from the optical lens subsystem and the illuminator to illuminate a FoV that is at a location between a near field and a far field. The FoV is illuminated at the near field and the far field with an irradiance that is within a range for all distances. The irradiance may be in range for distances ranging from 40 mm to 450 mm.

FIG. 16b demonstrates how a light beam emitted from a light emitting component is projected to a FoV in accordance with Method B of the present invention in illustration 1640. Optical lens subsystem 1650 has optically active surfaces 1652 and 1654. Optically active surface 1652 is tilted/curved on the YZ plane. The tilt/curvature of optically active surface 1652 may be in addition to a curvature on the XZ plane. Optical lens subsystem 1650 is positioned in front of light emitting component 1645. Light emitting component 1645 emits light beam 1660. Optically active surface 1652 receives and projects light beam 1660 to location in a FoV. Light beam 1660 exits optical lens subsystem 1650 with a different tilt.

FIG. 16c demonstrates how a light beam emitted from a light emitting component is projected to a FoV in accordance with Method C of the present invention in illustration 1670. Optical lens subsystem 1680 has optically active surfaces 1682 and 1684. Optically active surface 1684 is tilted/curved on the YZ plane. The tilt/curvature of optically active surface 1684 may be in addition to a curvature on the XZ plane. Optical lens subsystem 1680 is positioned in front of light emitting component 1675. Light emitting component 1675 emits light beam 1690. Optically active surface 1682 receives into optical lens subsystem 1680 and projects light beam 1660 to a location in a FoV. Light beam 1690 exits optical lens subsystem 1680 via optically active surface 1684 with a different tilt.

Figure 14:
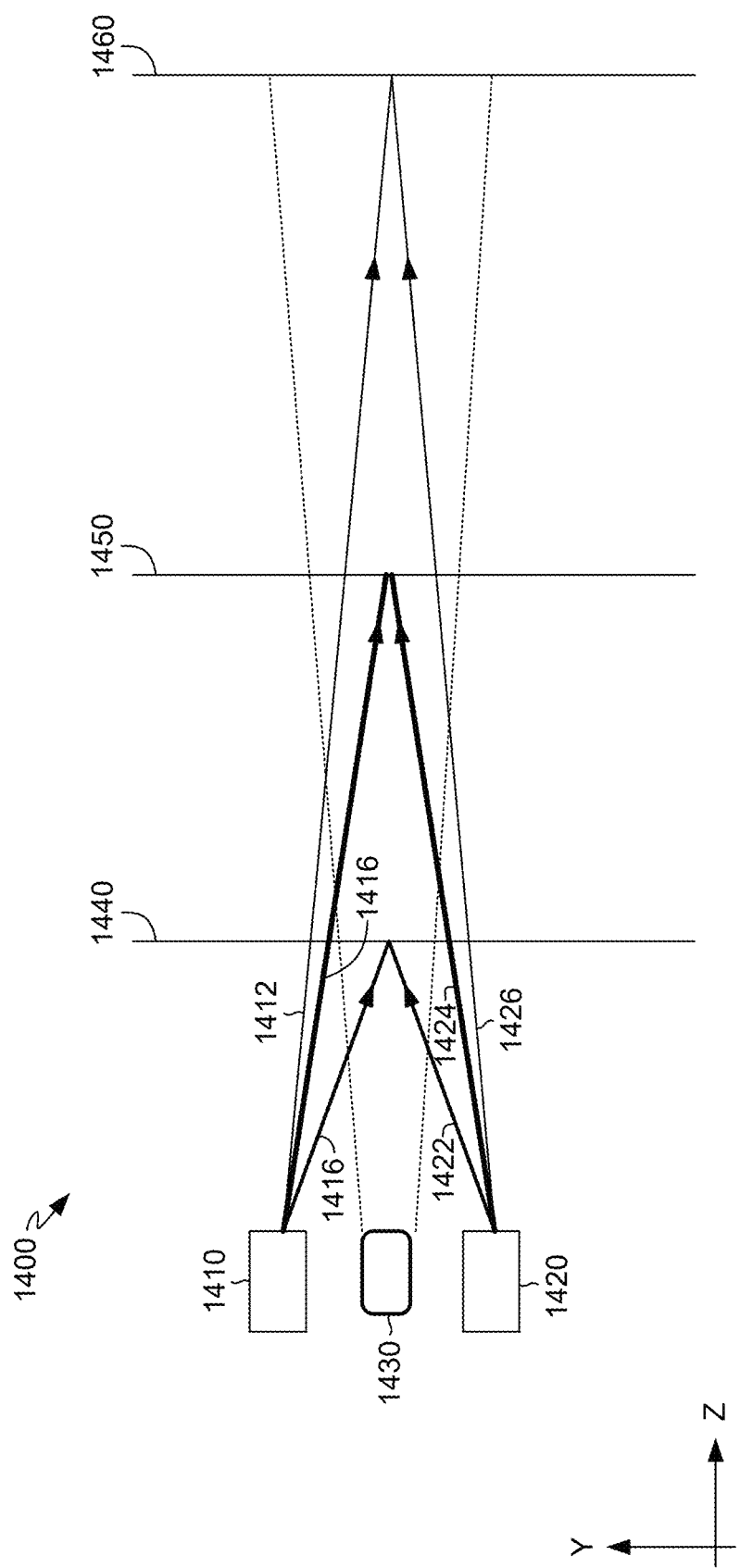
FIG. 14 depicts an illustration of an exemplary arrangement of light emitting components and optical lens subsystems projecting light beams at varying distances within the FoV of a optical receiving system in accordance with an embodiment of the present disclosure.

As FIG. 14 shows, the innovation of this invention provides tilting of portions of light beams 1412, 1414, 1416, 1422, 1424, and 1426 that are exiting the optical lens subsystems 1410 and 1420 over the YZ plane in illustration 1400. As a result, some light beams illuminate the near field 1440, some illuminate the medium field 1450, and some illuminate the far field 1460 of the FoV of optical receiving system 1430.

The present invention has been described in relation to particular embodiments, which are intended in all respects to be illustrative rather than restrictive. Many different arrangements of the various components depicted, as well as use of components not shown, are possible without departing from the spirit and scope of the present disclosure. Alternative aspects will become apparent to those skilled in the art that do not depart from the scope. It will be understood that certain features and subcombinations are of utility and may be employed without reference to other features and subcombinations and are contemplated as within the scope of the claims.

What is claimed is:

1. A system for providing illumination for a scanner, the system comprising:
   an optical receiving system that receives light;
   an illuminator that comprises a first optical lens subsystem positioned in proximity to the optical receiving system, wherein the first optical lens subsystem corresponds to a plurality of first light emitting components that project one or more first light beams through the first optical lens subsystem;
   a first subset of the plurality of first light emitting components being offset relative to a center of the first optical lens subsystem; and
   the first subset of the plurality of first light emitting components projects a first subset of the one or more first light beams such that the first subset of the one or more first light beams illuminate a field of view (FoV) of the scanner that is at a location between a near field and a far field, wherein an irradiance at the FoV is within a range for all locations between the near field and the far field, wherein a first optically active surface of the first optical lens subsystem is positioned in front of the plurality of first light emitting components and wherein the first optically active surface of the first optical lens subsystem includes one or more first portions that have different curvatures to concentrate light at different locations between the near field and the far field.

2. The system of claim 1, wherein the illuminator further comprises a second optical lens subsystem positioned in proximity to the optical receiving system, wherein the second optical lens subsystem corresponds to a plurality of second light emitting components that project one or more second light beams through the second optical lens subsystem.

3. The system of claim 2, further comprising a second subset of the plurality of second light emitting components being offset relative to a center of the second optical lens subsystem, wherein the second subset of the plurality of second light emitting components projects a second subset of the one or more second light beams such that the second subset of the one or more second light beams illuminate the FoV that is at the location between the near field and the far field, wherein the irradiance at the FoV is within the range for all locations between the near field and the far field, and wherein a first optically active surface of the second optical lens subsystem is positioned in front of the plurality of second light emitting components.

4. The system of claim 3, wherein the first optically active surface of the second optical lens subsystem includes one or more second portions that have different curvatures to concentrate light at different locations between the near field and the far field.

5. The system of claim 4, wherein each of the one or more first portions corresponds to an individual light emitting component of the plurality of first light emitting components and acts as a collimator of a first light beam of the individual light emitting component.

6. The system of claim 4, wherein each of the one or more second portions corresponds to an individual light emitting component of the plurality of second light emitting components and acts as a collimator of a second light beam of the individual light emitting component.

7. The system of claim 4, wherein a central portion of the one or more first portions and a central portion of the one or more second portions have a flatter curvature relative to other portions of the one or more first portions and the one or more second portions, and wherein the central portions concentrate light to the near field while other portions concentrate light to other locations between the near field and the far field.

8. A system for providing illumination for a scanner, the system comprising:
   an optical receiving system that receives light;
   an illuminator that comprises:
      a first optical lens subsystem positioned in proximity to the optical receiving system, wherein the first optical lens subsystem corresponds to a plurality of first light emitting components that project one or more first light beams through the first optical lens subsystem; and
      a second optical lens subsystem positioned in proximity to the optical receiving system, wherein the second optical lens subsystem corresponds to a plurality of second light emitting components that project one or more second light beams through the second optical lens subsystem;
   a first subset of the plurality of first light emitting components being offset relative to a center of the first optical lens subsystem, wherein the first subset of the plurality of first light emitting components projects a first subset of the one or more first light beams such that the first subset of the one or more first light beams illuminate a field of view (FoV) of the scanner that is at a location between a near field and a far field, wherein an irradiance at the FoV is within a range for all locations between the near field and the far field, wherein a first optically active surface of the first optical lens subsystem is positioned in front of the plurality of first light emitting components; and
   a second subset of the plurality of second light emitting components being offset relative to a center of the second optical lens subsystem, wherein the second subset of the plurality of second light emitting components projects a second subset of the one or more second light beams such that the second subset of the one or more second light beams illuminate the FoV that is at the location between the near field and the far field, wherein the irradiance at the FoV is within the range for all locations between the near field and the far field, and wherein a first optically active surface of the second optical lens subsystem is positioned in front of the plurality of second light emitting components, wherein each of a second optically active surface of the first optical lens subsystem and a second optically active surface of the second optical lens subsystem collimates the light to focus in the FoV.

9. The system of claim 2, wherein the plurality of first light emitting components and the plurality of second light emitting components are positioned at a distance from the center of the first optical lens subsystem or the center of the second optical lens subsystem.

10. A scanner comprising:
an optical receiving system;
a plurality of light emitting components that project a plurality of light beams;
an illuminator that comprises at least one optical lens subsystem positioned in proximity to the optical receiving system, wherein the at least one optical lens subsystem corresponds to the plurality of light emitting components;
a first subset of the plurality of light emitting components comprising one or more light emitting components being offset relative to a center of the at least one optical lens subsystem; and
the first subset of the plurality of light emitting components projects a first subset of light beams such that the subset of the light beams illuminates a field of view (FoV) that is at a location between a near field and a far field, wherein an irradiance at the FoV is within a range for all distances for the FoV,
wherein a first optically active surface of the at least one optical lens subsystem is positioned in front of the one or more light emitting components, and
wherein the first optically active surface of the at least one optical lens subsystem includes a plurality of portions that have different curvatures to concentrate light at different locations between the near field and the far field.

11. The scanner of claim 10, wherein a second optically active surface of the at least one optical lens subsystem is an exit surface for the one or more light emitting components, wherein the second optically active surface is divided into portions.

12. The scanner of claim 10, wherein a second optically active surface of the at least one optical lens subsystem is an exit surface for the one or more light emitting components, wherein the second optically active surface is a single exit surface.

13. The scanner of claim 10, wherein a second subset of the plurality of light emitting components comprises one or more light emitting components corresponding to the center of the at least one optical lens subsystem such that the second subset of the plurality of light emitting components project a second subset of light beams to the far field.

14. The scanner of claim 10, wherein the one or more light emitting components are adjustable and correspond to an offset that is adjustable, and wherein the offset is a distance from the center of the at least one optical lens subsystem.

15. A method for providing illumination for a scanner, the method comprising:
receiving light by an optical receiving system;
positioning an illuminator that comprises a first optical lens subsystem and a second optical lens subsystem in proximity to the optical receiving system, wherein the first optical lens subsystem corresponds to a plurality of first light emitting components that project a plurality of first light beams, and the second optical lens subsystem corresponds to a plurality of second light emitting components that project a plurality of second light beams;
offsetting a first subset of the plurality of first light emitting components relative to a center of the first optical lens subsystem;
offsetting a second subset of the plurality of second light emitting components relative to a center of the second optical lens subsystem;
projecting by the first subset of the plurality of first light emitting components, a first subset of the plurality of first light beams such that the first subset of the plurality of first light beams illuminate a field of view (FoV) that is at a location between a near field and a far field, wherein an irradiance at the FoV is within a range for all locations between the near field and the far field; and
projecting by the second subset of the plurality of second light emitting components, a second subset of the plurality of second light beams such that the second subset of the plurality of second light beams illuminate a FoV that is at a location between the near field and the far field, wherein an irradiance at the FoV is within a range for all locations between the near field and the far field.

16. The method of claim 15, wherein the first optical lens subsystem and the second optical lens subsystem are positioned symmetrically about the optical receiving system.

17. The method of claim 15, wherein a first optically active surface of the first optical lens subsystem is positioned in front of the one or more first light emitting components and a first optically active surface of the second optical lens subsystem is positioned in front of the one or more second light emitting components.

18. The method of claim 17, wherein the first optically active surface of the first optical lens subsystem includes one or more first portions that have different curvatures to concentrate light at different locations between the near field and the far field, and the first optically active surface of the second optical lens subsystem includes of one or more second portions that have different curvatures to concentrate light at different locations between the near field and the far field.

19. The method of claim 18, wherein a central portion of the one or more first portions and a central portion of the one or more second portions have a flatter curvature relative to other portions of the one or more first portions and the one or more second portions, and wherein the central portions concentrate light to the near field while other portions concentrate light to other locations between the near field and the far field.

20. The method of claim 17, wherein each of a second optically active surface of the first optical lens subsystem and a second optically active surface of the second optical lens subsystem collimates the light to focus in the FoV.

* * * * *